Aug. 18, 1959     L. J. B. LA COSTE     2,899,826
LEVELING MEANS FOR GRAVITY METERS OR THE LIKE
Filed Jan. 25, 1956     3 Sheets-Sheet 1

Lucien J. B. LaCoste,
INVENTOR.

BY J. Vincent Martin
Joe E. Edwards
B. R. Pravel
ATTORNEYS

Aug. 18, 1959  L. J. B. LA COSTE  2,899,826
LEVELING MEANS FOR GRAVITY METERS OR THE LIKE
Filed Jan. 25, 1956  3 Sheets-Sheet 3

Lucien J. B. LaCoste
INVENTOR.

BY J. Vincent Martin
Joe E. Edwards
B. R. Pravel
ATTORNEYS

United States Patent Office 2,899,826
Patented Aug. 18, 1959

2,899,826

LEVELING MEANS FOR GRAVITY METERS OR THE LIKE

Lucien J. B. La Coste, Austin, Tex., assignor to La Coste & Romberg, Austin, Tex., a partnership Application January 25, 1956, Serial No. 561,236

16 Claims. (Cl. 73—382)

This invention relates to new and useful improvements in leveling means for gravity meters or the like which are particularly useful when a steady base is not available on which to mount the gravity meter, as for instance on board a submarine.

In my copending United States patent application, Serial No. 459,489, a leveling mechanism for a gravity meter is disclosed which includes a stabilized platform on which the gravity meter is mounted. As disclosed in said application, the stabilized platform is stabilized by a long period pendulum so that accelerations of the submarine or other carrier for the gravity meter and its associated apparatus do not interfere with an accurate indication by the gravity meter. However, it has been found that with the stabilized platform construction of said application, extreme horizontal accelerations of the submarine or other carrier sometimes cause the movable element in the gravity meter to hit its support, which of course results in inaccurate indications by the gravity meter.

It is therefore an object of this invention to provide a new and improved leveling means for a gravity meter or the like, which means is adapted to be used in combination with the level indicating mechanism disclosed in said copending application.

An important object of this invention is to provide a new and improved oscillation damping means for a gravity meter or the like wherein the gravity meter is suspended as a pendulum from practically frictionless gimbals or the like, and wherein said damping means reduces the natural swinging of the hanging gravity meter without introducing friction in the gimbals, whereby leveling errors of the gravity meter are avoided by the practically frictionless suspension of the gravity meter while at the same time oscillations of the hanging gravity meter are damped out.

Another object of this invention is to provide a new and improved oscillation damping means for a gravity meter or the like suspended as a pendulum, wherein the point of suspension of the gravity meter is moved out of phase with the swinging of the gravity meter to damp out such swinging or oscillations of the meter, whereby excessive swinging of the meter is avoided.

A further object of this invention is to provide a new and improved suspension apparatus for a gravity meter or the like wherein a gravity meter is suspended from a practically frictionless suspension means, and wherein the gravity meter has a level indicating mechanism combined therewith, the level indicating mechanism transmitting a motion to the point of suspension of the gravity meter to displace same in a horizontal direction an amount proportional to the negative velocity of the gravity meter to damp out such swinging or oscillations.

Another object of this invention is to provide a gimbal mounting for a gravity meter which eliminates substantially all tangential forces on the gravity responsive element of the gravity meter due to motion of the gravity meter about the gimbal suspension, thus subjecting the gravity responsive element only to a force which acts substantially through the center of the gimbal suspension.

An additional object is to provide a gimbal mounting for a gravity meter which prevents horizontal accelerations of the submarine or carrier from causing the movable element of the gravity meter to strike stationary members of said gravity meter.

A further object is to provide a gimbal mounting for a gravity meter which simplifies the corrections which are required to be made to the gravity meter reading because of the horizontal accelerations of the submarine or carrier.

The invention will be more readily understood from a reading of the following specification and by reference to the accompanying drawings forming a part thereof, wherein an example of the invention is shown, and wherein.

Figures 1, 5, 6:
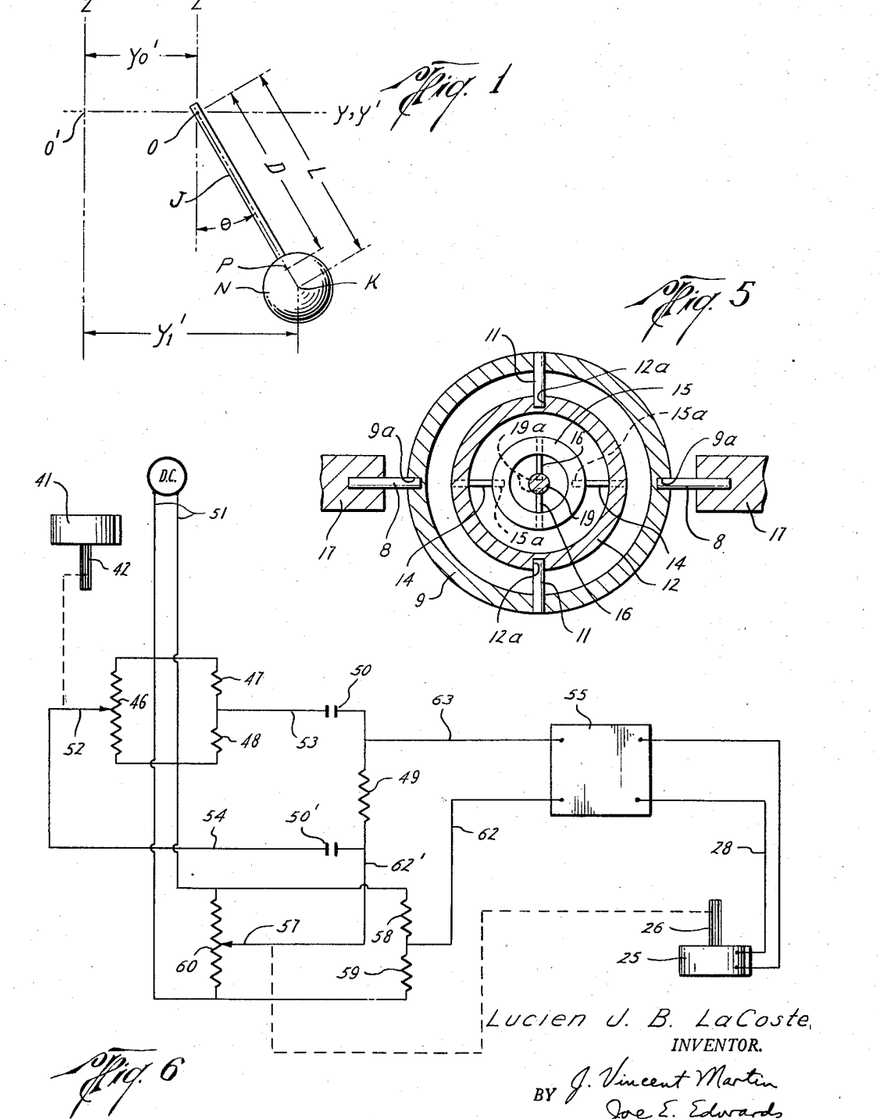
Figure 1 is a diagram used in the derivation of the equations of motion of a gimbal supported instrument.
Figure 5 is a sectional view taken along 5—5 in Figure 2 to show the gimbal construction.
Figure 6 is the electrical circuit for one of the servo motors of Figure 2 which is used for damping oscillations of the gimbal supported instrument.

Before describing the invention in detail, it is believed that a discussion of the problems encountered in leveling a gravity meter by suspending it like a pendulum as shown in Figure 1 will be helpful. In Figure 1 the gravity meter N is suspended from the point 0 by means of the arm J so that it can swing in any direction about O. The preferred form of suspension at O is a gimbal joint which will automatically level the gravity meter provided that no disturbing horizontal accelerations are present. The gravity meter N is of course fixed to the supporting arm J at the correct angle so that it measures the component of gravitational or accelerational force in the direction OK extending between the point of suspension O and the center of gravity K of the suspended mass. The gravity meter will then measure the vertical component of gravity, which is the total gravity, when the freely suspended pendulum consisting of N and J has come to rest and there are no disturbing horizontal accelerations.

However, the readings of a gravity meter suspended as just described will be affected either by (1) swinging of the gravity meter N even when no horizontal accelerations are present or by (2) horizontal accelerations of the point of support O. It can be seen that swinging of the gravity meter about O will affect the gravity meter readings because the gravity meter does not remain level while swinging and also because swinging produces a centrifugal force which is added to the component of gravitational force measured by the gravity meter.

Since swinging of this type actually takes place when a gimbal supported gravity meter is used in a submarine or similar carrier, it is important to correct or compensate for such swinging. It is also desirable to minimize the swinging so that the correction is as small as possible. With this invention, this swinging is minimized by means of a servo operated device which applies horizontal motions to the point of support O at just the right instants of time to reduce the swinging. The device of this invention, which will be described in detail hereinafter, damps out the swinging without introducing any friction into the gimbal suspension, which friction would greatly complicate the problem of making corrections for the swinging. The mathematics showing the effect on the reading of the gravity meter due to swinging will also be set forth hereinafter. Such mathematics show that the effect is a complicated function of the swinging unless the gravity meter N is mounted in a certain way on the arm J. The simplification produced by proper mounting of the gravity meter has not been known in the past and therefore previous workers in the field of submarine gravimetry have neglected the effect of this type of swinging on the reading of their gravity measuring devices although they did include motion produced by horizontal accelerations. (See for example "Pendulum Observations at Sea, Part II" by F. A. Vening-Meinesz, Delft, 1941.)

The mathematics to be set forth herein later shows that the effect on the reading of the gravity meter due to swinging can be simplified by mounting the gravity meter as follows. In Fig. 1:

$L=$ the distance from the point of support O of the gravity meter N and arm J to the center of gravity K of the combination of N and J,
$M=$ the mass of the combination N and J,
$I=$ the moment of inertia of the combination N and J,
and
$D=$ the distance from O to the gravity responsive element of the gravity meter N.

Then the mathematics shows that the gravity meter N should be mounted on the arm J so that:

$$D=\frac{I}{ML}$$

and D is on a line through O and K.

The mathematics also shows a simple way of determining the optimum point at which the gravity responsive element of the gravity meter N should be placed. This optimum point is the point at which a level bubble will not indicate tilt as the gravity meter N swings about O. A level bubble mounted closer to O than this optimum point will move in the same direction as the gravity meter N as the gravity meter swings and similarly a level bubble mounted farther from O than the optimum point will move in the opposite direction from N.

This method of obtaining the optimum position at which to place the gravity responsive element of the gravity meter shows another advantage to be gained by such mounting of the gravity meter. Since a level bubble at the optimum point would not deflect in spite of swinging of the gravity meter, it is evident that at such point there are no lateral or tangential forces on the bubble in spite of swinging. By putting the gravity responsive element of the gravity meter at this point, there would be no lateral forces on it which might cause it to hit stationary parts near it in the gravity meter. This is important because gravity meters usually have very small side clearances between the gravity responsive element and stationary dampers.

The preceding discussion has been directed toward the effects of swinging of a gimbal supported gravity meter about its point of support, which swinging can take place even when no disturbing horizontal accelerations are present at the point of support. However, the readings of a gravity meter are also affected by horizontal accelerations of the point of support O in Fig. 1. These horizontal accelerations affect the readings because they tilt the gravity meter and also because they accelerate it thereby giving acceleration forces which are indistinguishable from the gravitational force. The corrections required to compensate for horizontal accelerations are included in detail hereinafter wherein the mathematics show that the corrections are simplified by mounting the gravity meter as previously described and that all the desirable features of such a mounting apply just as well to disturbances caused by the application of horizontal accelerations to the point of support O as they do to the effects of natural swinging about O.

Figure 2:
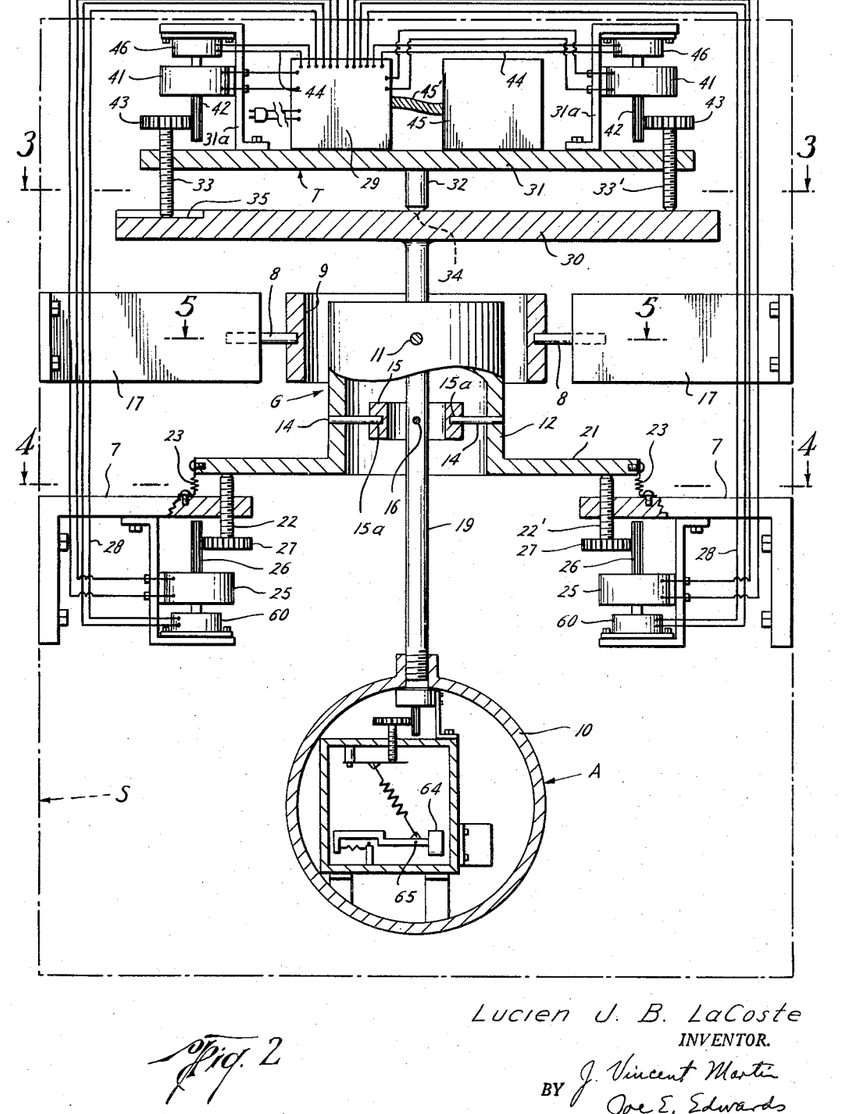
Figure 2 is an elevation, partly in section, of the preferred form of the invention.

Considering now the drawings wherein an example of the device of this invention is illustrated for damping out the natural swinging of a gimbal supported gravity meter, the letter A designates a gravity meter of known construction, an example of which is disclosed in my co-pending patent application, Serial No. 536,062. Such gravity meter A has a spherical housing 10 which has a rod 19 connected thereto for suspending or hanging the gravity meter A as a pendulum from a double gimbal assembly G which is mounted on fixed supports or frames 7 and 17 in a submarine or other carrier S. A plate 30 is connected to the upper end of the rod 19. A level or tilt-measuring means T, including a stabilized platform 31 therewith, is mounted above the plate 30 for maintaining the platform 31 "level" or horizontal in space at all times as described in my copending U.S. patent application, Serial No. 459,489. Oscillations of the gravity meter A are transmitted to the plate 30. The plate 31, however, is prevented from following these oscillations because of the action of the level or tilt measuring mechanism T, which keeps the plate 31 in a horizontal position, as well be fully explained. The relative movements of the plate 30 with respect to the stabilized plate 31 are a measure or indication of the swinging motion of the gravity meter A; these relative movements are converted by servo motors 41 into voltages proportional to the movements. These voltages are electrically differentiated to obtain voltages proportional to the negative swinging velocity of the gravity meter A. The differentiated voltages drive servo motors 25 to operate screws 22 and 22′, the displacements of said screws being proportional to the differentiated voltages. The motion of screws 22 and 22′ effects a lateral shifting of the rod 19 at its point of suspension in the gimbals G in a horizontal direction. This lateral shifting is thus proportional to the negative velocity of swinging of gravity meter A and therefore, as will be shown hereinafter with mathematics, this lateral shifting will damp the swinging of the gravity meter about its point of suspension. It should be noted that the phase of the lateral shifting is about 90° behind the swinging of the gravity meter because the lateral shifting is substantially proportional to the negative velocity of the swinging of the gravity meter. It is well known that such out of phase shifting damps out swinging. The purpose of damping out the swinging is, of course, to reduce the corrections required to be made because of swinging.

Considering the invention in detail, the construction of the double gimbals G, which is a practically frictionless suspension for the rod 19 to which the meter A is connected, is best seen in Figures 2 and 5. Shafts or pins 8 on the upper frame 17 fit in sockets or bearings 9a of an outer gimbal ring 9. Shafts or pins 11 are fixed to the outer gimbal ring 9 and fit in sockets or bearings 12a of cylinder 12. Thus, cylinder 12 is supported on the fixed frames 17 by an ordinary gimbal joint.

In a like manner, shafts or pins 14 are fixed to cylinder 12 and fit in sockets or bearings 15a in an inner gimbal ring 15. Shafts or pins 16 are fixed to inner gimbal ring 15 and fit in sockets or bearings 19a on rod 19. Thus, rod 19 is supported from cylinder 12 by a second ordinary gimbal joint which thereby permits free swinging of the gravity meter A about the horizontal axes of pins 14 and 16 to allow the gravity meter to assume a level position under the influence of gravity when horizontal accelerations acting thereon are absent. It should be noticed, however, that the axes of rotation of the second gimbal joint are lower than the axes of the first gimbal joint. This is done in order to be able to give horizontal motions to the point of support or suspension 16 of the gravity meter A by tilting cylinder 12, as will be explained.

Figure 4:
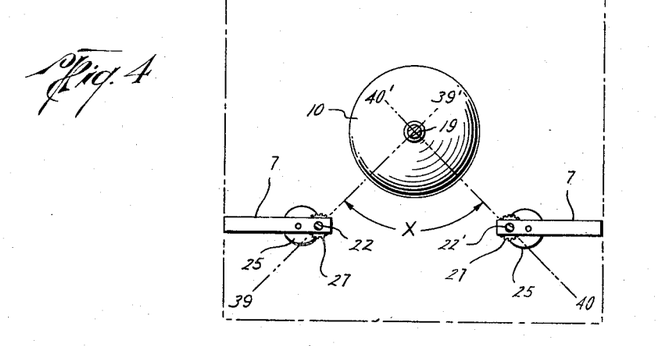
Figure 4 is a sectional view taken along 4—4 in Figure 2.

In order to impart such horizontal motion to the point of support or suspension of the gravity meter A by tilting the cylinder 12, a plate 21 is fixed to cylinder 12 which is adapted to be tilted by the two screws 22 and 22' which are threaded in the lower portions of the frames 7. Plate 21 is held in contact with these screws by means of the helical springs 23. Fig. 4 shows the relative positions of the rod 19 and screws 22 and 22'. The angle X is made approximately 90° so that motions of the two screws cause tilting of plate 21 about mutually perpendicular axes 39—39' and 40—40'. Screws 22 and 22' are each turned by one of the electric servo motors 25. The pinion 26 on the shaft of one of the motors 25 turns a gear 27, which is fixed to screw 22. The screw 22' is similarly actuated by one of the motors 25. The motors 25 are connected through cables 28 to a stabilized platform servo amplifier unit 29, the operation of which will be described later.

The shafts of motors 25 are connected to shafts of linear potentiometers 60 and the electrical outputs of potentiometers 60 are fed to the servo amplifier unit 29 through cables 28. The electrical outputs are proportional to the rotations of servo motors 25, and therefore proportional also to the corresponding horizontal motions given to the rod 19 of gravity meter unit A at its point of support 16. The voltage of potentiometer 60, associated with screw 22, will be proportional to the horizontal motion perpendicular to axis 40—40' in Fig. 4, and the voltage of potentiometer 60 associated with screw 22' will be proportional to the horizontal motion perpendicular to axis 39—39'.

Figure 3:
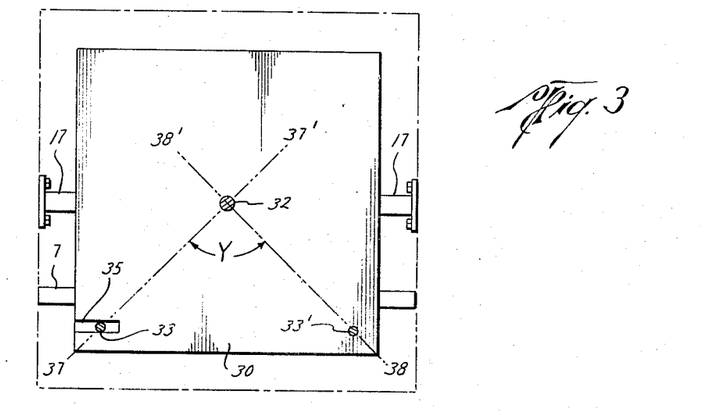
Figure 3 is a sectional view taken along 3—3 in Figure 2.

As previously mentioned, the plate 30 is fixed to the upper end of rod 19 and plate 31 is supported on plate 30 by means of pin 32 and screws 33 and 33'. Pin 32 is fixed to plate 31 and rests in a circular depression 34 in plate 30. Screw 33 is threaded in plate 31 and rests in a groove 35 in plate 30. Screw 33' is also threaded in plate 31 and rests on plate 30. The relative positions of pin 32 and screws 33 and 33' are shown in Figure 3. The angle Y is made approximately equal to 90° so that motions of screws 33 and 33' cause tilting of plate 30 about mutually perpendicular axes 37—37' and 38—38'. Screws 33 and 33' are also placed to make the axes 37—37' and 38—38' substantially parallel to axes 39—39' and 40—40', respectively.

Screw 33 is operated by one of the two servo motors 41 through gears 42 and 43. Similarly, screw 33' is operated by the other servo motor 41 through gears 42 and 43. The servo motors 41 are controlled by the servo amplifier unit 29 through their respective electrical cables 44. The servo amplifier unit 29 is controlled by stabilized direction indicators such as the long period inertia pendulums of the type described in my copending patent application, Serial No. 459,489, or well-known gyros or similar equipment. These stabilized direction indicators are shown schematically in the drawings (Figure 2) as a unit 45 which is connected to the amplifier unit 29 by multiconductor cable 45'.

The system just described operates to stabilize plate 31 in space in the following way: If plate 31 tends to tilt in relation to a plane fixed in space, the stabilized direction indicators in the unit 45 will supply signals to servo amplifiers in unit 29. These servo amplifiers will operate one or both of the servo motors 41 to rotate either or both of screws 33 and 33' to eliminate the assumed tilt of plate 31, which therefore provides a stabilized platform 31, the details of which are given in my copending patent application, Serial No. 459,489, and in literature elsewhere. It is to be noted however that since plate 31 is stabilized in space, the rotation of screw 33 measures the tilt of plate 30 about axis 38—38'. Similarly the rotation of screw 31' measures the tilt of plate 30 about axis 37—37'. In order to obtain voltages proportional to these tilts, linear potentiometers 46 are mounted on brackets 31a on the plate 31 with their shafts fixed to the shafts of their respective motors 41.

These voltages are fed through cables 44 to the servo amplifier unit where they are differentiated (or their phases are shifted) and the differentiated voltages from each of the potentiometers 46 is used to control the servo motor 25 with which it is electrically connected. An electrical circuit diagram for one of the two servo motors 25 is shown in Figure 6. The circuit diagram for the other servo motor 25 is, of course, identical. As shown in such circuit diagram, direct current power from the power lines 51 is supplied to the Wheatstone bridge circuit consisting of the linear potentiometer 46 and fixed resistors 47 and 48. The movable arm 52 of potentiometer 46 is fixed to the shaft of servo motor 41 as schematically indicated in Figure 6 by the dotted line therebetween; the voltage across conductors 53 and 54 is therefore proportional to the rotation of servo motor 41 or to the angle of tilt of plate 30 about axis 38—38'. This voltage is applied to the differentiating or phase-shifting network consisting of resistor 49 and condensers 50 and 50' in series. The differentiated or phase-shifted voltage is obtained across resistor 49. The values of resistor 49 and condensers 50 and 50' are chosen to shift the voltage about 90° at the natural frequency of oscillation of gravity meter A about the gimbal suspension. The manner in which the differentiated or phase-shifted voltage is fed to the servo amplifiers 55 of the unit 29 will be described presently.

A movable contact 57 on the linear potentiometer 60 is mechanically connected to the shaft of servo motor 25, as schematically indicated in Figure 6 by the dotted line therebetween. Also, D.C. power from the power lines 51 is applied across the Wheatstone bridge consisting of the potentiometer 60 and fixed resistors 58 and 59. The voltage across conductors 62 and 62' is therefore proportional to the rotation of servo motor 25. This voltage is subtracted from the previously mentioned differentiated or phase-shifted voltage appearing across resistor 49 by connecting conductor 62' to one side of resistor 49 as shown in Figure 6. The difference between the two voltages then appears across conductors 62 and 63 and is fed into servo amplifier 55 to operate servo motor 25 to reduce this voltage difference to zero and thereby to rotate screw 22 an amount proportional to the differentiated or phase-shifted voltage appearing across resistor 49.

The rotation of servo motor 25 results in a horizontal motion being given to the rod 19 at its points of attachment 16 to gimbals G. This horizontal motion is in a direction substantially perpendicular to axis 38—38', and is caused by tilting of plate 30 about axis 38—38'. However, the horizontal motion is out of phase with the tilting of plate 30 in order to damp out the swinging of the meter A. The rotation of the screw 22' for damping swinging about axis 37—37' operates, of course, exactly the same way and may be effected simultaneously with the rotation of the screw 22 to control the direction of the movement imparted to the point of suspension of the meter A. The extent of tilting of the ring 12, is controlled by the extent of rotation of the screws 22 and 22'.

The operation of the preferred embodiment of the invention is believed evident from the foregoing description. Assuming the apparatus of this invention is in a submarine or other carrier S (Figure 2), the gravity meter A is subject to oscillations or swinging in the manner of a pendulum about its gimbal suspension G, particularly when horizontal accelerations of the submarine or carrier S occur. Such oscillations are transmitted to the plates 30 and 31 which causes the stabilized direction indicators of unit 45 to signal the servo amplifiers of unit 29. These servo amplifiers of the unit 29 control the operation of the servo motors 41 so as to effect the rotation of the screws 33 and 33' a sufficient amount to maintain the plate 31 horizontal in space regardless of the particular tilt of the plate 30. Voltages proportional to the tilt of the plate 30 about the axes 37—37' and 38—38' are obtained with the potentiometers 46 associated with the screws 33 and 33', respectively. Such voltages are differentiated or shifted out of phase with the electrical network of resistor 49 and condensers 50 and 50' in series (Figure 6). These differentiated or phase shifted voltages are applied to the servo amplifiers 55 which in turn drive the servo motors 25 and the screws 22 and 22', as has been explained. The rotation of these screws is proportional to the differentiated or phase shifted voltages.

The rotation of the screws 22 and 22' causes a tilting of the ring 12 about either or both of the axes 39—39' and 40—40' in accordance with the tilting of the plate 30 about the axes 37—37' and 38—38'. Such tilting of the ring 12 laterally shifts the ring 12 so that the point of suspension of the gravity meter A on its rod 19 is shifted laterally perpendicularly to the axes 39—39' and 40—40'.

Thus, when the meter A is at the right hand end of its swing and about to move to the left, the apparatus of Figure 2 operates as described to shift the point of suspension at the pins 16 in a direction to the right (Figure 2). Similarly, as the meter A begins to swing back to the right or return from its maximum swing to the left, the point of suspension of the meter A is shifted to the left. The point of suspension does not move when the meter A is at the center of its swing as shown in Figure 2 although at this point the meter has its maximum speed due to swinging.

The above procedure for damping a swinging body, which we shall call "servo damping" is very effective in stopping the swinging. Furthermore, it does not require any friction between the swinging body and the support; it accomplishes damping by slightly altering the horizontal motion to which the suspended gravity meter is subjected. This slight change in horizontal motion of course has no effect on the accuracy of the gravity readings. Actually, in the preferred form of the invention, the point of suspension of the gravity meter is moved less than a quarter inch.

The theoretical basis underlying the operation of the servo damper can be understood from a consideration of the following mathematical relationships. As previously explained, Figure 1 shows a gravity meter or other instrument N fixed to an arm J. The arm J hangs from a gimbal or the like at a point O. The instrument N has its center of gravity at K. The origin of a coordinate system, $x, y, z$ is fixed to the point O. The $z$-axis of this coordinate system extends vertically upward; the $y$-axis and the $x$-axis (not shown) extend horizontally. We will consider motion only in the $yz$ plane because motions in the $xz$ plane are of the same form as in the $yz$ plane and motions in the two planes are independent of each other. A second coordinate system $x'y'z'$ with origin O' is also shown in Figure 1. This coordinate system has its origin O' fixed in space rather than to the point O on the arm J. Referring to Figure 1, the following definitions are used:

$\theta$ = the angle from the negative $z$-axis to the line O—K through the center of gravity K of the instrument N,
$L$ = the distance from the point of support O of the instrument N to its center of gravity K,
$M$ = the mass of the instrument,
$I$ = the moment of inertia of the instrument about O,
$D$ = The distance from O to the gravity responsive element P of the gravity meter N and is on a line through O and K,
$g$ = the acceleration due to gravity,
$y_1'$ = the distance from the $z'$ axis to K,
$y_0'$ = the distance from the $z'$ axis to O.

Then the force on the gravity meter N and arm J directed along the $y$-axis is approximately:

(1') $$F = -Mg\theta$$

Also the angle $\theta$ is approximately given by:

(2') $$\theta = \frac{y_1' - y_0'}{L}$$

Substituting this value of $\theta$ into Equation 1' gives:

(3') $$F = -\frac{Mg}{L}(y_1' - y_0')$$

Using dots to indicate differentiation with respect to time, the equation of motion of N is:

(4') $$M\ddot{y}_1' = F = -\frac{Mg}{L}(y_1' - y_0')$$

or (5') $$L\ddot{y}_1' - gy_0' + gy_1' = 0$$

An inspection of Equation 5' shows that this equation can be given the usual form of a damped harmonic motion differential equation by making:

(6') $$y_0' = -k\dot{y}_1'$$

when $k$ is any arbitrary positive constant. Equation 5' then becomes:

(7') $$L\ddot{y}_1' + gk\dot{y}_1' + gy_1' = 0$$

which is the equation of damped harmonic motion. Swinging of the instrument N can therefore be damped out by shifting the point of support O horizontally so that its displacement $y_0'$ from a fixed point O' is proportional to the negative velocity $-\dot{y}_1'$ of the center of gravity K of the instrument N (including the arm J). The servo damping device previously described shifts the point O in this way to achieve damping.

It is to be noted that if the swinging motion of K is sinusoidal, the negative velocity of swinging is also sinusoidal and lags the swinging motion by 90°. The horizontal motion of O required for damping is therefore also sinusoidal and lags the swinging motion of K by 90°. The operation of the servo damper can therefore be described in this way also.

The mathematics required to determine the optimum point P in Figure 1 at which the gravity responsive element of the gravity meter should be placed in order to avoid lateral or tangential forces on the gravity responsive element will now be considered. In this derivation we will also determine the corrections necessary to be added to the gravity meter indications because of motion of the gravity meter N about the point O. These corrections are simplified when the gravity responsive element of the gravity meter N is at the optimum point P which is the point at which a level bubble will not indicate tilt as the meter N swings about O, as previously explained. The equation of motion of the instrument N supported at the point O when the point O (and coordinate axis $xyz$) is stationary is:

(1) $$I\ddot{\theta} + MgL \sin \theta = 0$$

Assuming that the coordinate system is accelerated to the right with an acceleration $a$, this acceleration is equivalent to the application of a force $-Ma$ at the center of gravity K of the instrument when the coordinate system is considered as stationary. This force exerts on the instrument N a clockwise torque $-MaL \cos \theta$ about the point O. Adding this torque to Equation 1 gives (2) $$I\ddot{\theta} + MgL \sin \theta = -MaL \cos \theta$$

Since small values of $\theta$ are encountered in practice $\sin \theta$ is replaced by $\theta$ and $\cos \theta$ by 1 in Equation 2. Therefore:

(3) $$\ddot{\theta} + \frac{MgL}{I}\theta = -\frac{ML}{I}a$$

The behavior of the gimbal-supported instrument will be considered when the acceleration $a$ is taken as:

(4) $$a = A \sin wt$$

where $A$ and $w$ are constants.

We will also define $w_0$ by the relation:

(5) $$w_0^2 = \frac{MgL}{I}$$

It will be seen later that $w_0$ is $2\pi$ times the natural frequency of the gimbal-supported instrument.

If Equations 4 and 5 are substituted into Equation 3, then the following is obtained:

(6) $$\ddot{\theta} + w_0^2 \theta = -\frac{w_0^2 A}{g} \sin wt$$

The solution of Equation 6 is given by:

(7) $$\theta = B \sin wt + C \sin w_0 t$$

if $B$ is properly chosen. In order to determine $B$, Equation 7 and its derivatives are substituted into Equation 6. This substitution gives (8) $$A = Bg\left(\frac{w^2}{w_0^2} - 1\right)$$

Also since Equation 7 is a solution of Equation 6, it follows that $w_0 = 2\pi$ times the natural frequency of oscillation of the gimbal-supported instrument. Substituting this expression for $A$ into Equation 4 gives:

(9) $$a = Bg\left(\frac{w^2}{w_0^2} - 1\right) \sin wt$$

Also differentiating Equation 7 gives:

(10) $$\dot{\theta} = Bw \cos wt + Cw_0 \cos w_0 t$$

The acceleration at a point P on the center line of the instrument N will now be determined. The acceleration at point P directed toward the origin O is:

(11) $$a_n = D\dot{\theta}^2 - a \sin \theta + g \cos \theta$$

Since $\theta$ is a small angle, $\sin \theta$ is replaced by $\theta$ and $\cos \theta$ by $$1 - \frac{\theta^2}{2}$$

in Equation 11. This gives:

(12) $$a_n = D\dot{\theta}^2 - a\theta + g - \frac{g\theta^2}{2}$$

If Equations 7, 9 and 10 are substituted in Equation 12, the following is obtained:

(13)
$$a_n = g + DB^2 w^2 \cos^2 wt + 2DBCww_0 \cos wt \cos w_0 t$$
$$+ DC^2 w_0^2 \cos^2 w_0 t + B^2 g\left(\frac{1}{2} - \frac{w^2}{w_0^2}\right) \sin^2 wt$$
$$- BCg \frac{w^2}{w_0^2} \sin wt \sin w_0 t - \frac{C^2 g}{2} \sin^2 w_0 t$$

Since the average value $\overline{a_n}$ of $a_n$ averaged over many cycles of $w$ and $w_0$ is to be determined the following average values are substituted into Equation 13 to obtain $\overline{a_n}$:

(14) $$\overline{\cos^2 wt} = \overline{\sin^2 wt} = \overline{\cos^2 w_0 t} = \overline{\sin^2 w_0 t} = \tfrac{1}{2}$$

(15) $$\overline{\cos wt \cos w_0 t} = \overline{\sin wt \sin w_0 t} = 0$$

Then the following is obtained:

(16) $$g = \overline{a_n} - g\left(\frac{DB^2 w^2}{2g} + \frac{DC^2 w_0^2}{2g} + \frac{B^2}{4} - \frac{B^2 w^2}{2w_0^2} - \frac{C^2}{4}\right)$$

The quantity $\overline{a_n}$ is the average indication which an actual gravity meter will give if it is suspended in gimbals as shown with its gravity-responsive member at a distance $D$ from the point of support O.

Therefore, $\overline{a_n}$ might be considered to be the apparent value of gravity indicated by the gravity meter. The second term on the right side of Equation 16 is therefore the correction which must be subtracted from the apparent value of gravity in order to obtain the actual value of gravity.

It can be seen from Equation 16 that this correction term is in general very complicated, and furthermore it depends in a different way on the amplitudes B and C of the forced oscillations and of the natural oscillations respectively of the gimbal-supported instrument. This means that in general both amplitudes have to be determined separately. Previous workers who have obtained gravity readings at sea using pendulums rather than gravity meters have ignored this difficulty; see, for instance, "Pendulum Observations at Sea, Part II" by F. A. Vening-Meinesz, Delft, 1941.

However, it is possible to simplify Equation 16 by properly choosing the distance D. To do this:

(17) $$D = \frac{g}{w_0^2} = \left(\frac{I}{ML}\right)$$

Substituting this value for D into Equation 16 gives:

(18) $$g = \overline{a_n} - \left(\frac{B^2}{4} + \frac{C^2}{4}\right)$$

Equation 18 can be further simplified by noting that the average value of $\theta^2$ is:

(19) $$\overline{\theta^2} = \frac{B^2}{2} + \frac{C^2}{2}$$

We therefore have:

(20) $$g = \overline{a_n} - \frac{g\overline{\theta^2}}{2}$$

In order to get an idea of the optimum value of D given in Equation 17, it is assumed that the mass of instrument N is concentrated at its center of gravity, Equation 17 then gives:

(21) $$D = \frac{I}{ML} = \frac{ML^2}{ML} = L$$

In other words, the gravity responsive element of the gravity meter should be at the center of gravity if the total weight of the gravity meter can be assumed to be concentrated at its center of gravity.

From the following, it can also be seen how another advantage results from using the value of D given by Equation 17. Since the lateral clearance in a gravity meter is usually very small, particularly in a highly damped meter, the movable element of a gravity meter might be caused to strike some part of the fixed supporting structure if the gravity meter is subjected to large lateral accelerations. Therefore all chance of the moving system hitting the side-supporting structure will of course be avoided if the lateral accelerations can be eliminated. It will now be shown that the gimbal mounting of Figure 1 will do this if D is chosen to satisfy Equation 17.

The following Formula 22 expresses the acceleration at point P in a direction perpendicular to line O—K:

(22) $$a_t = D\ddot{\theta} + a \cos \theta + g \sin \theta$$

Since $\theta$ is small, Equation 22 is approximated by:

(23) $$a_t = D\ddot{\theta} + a + g\theta$$

Substituting Equations 7 and 9 into Equation 23 gives:

(24) $$a_t = g\left(1 - \frac{Dw_0^2}{g}\right)\left(\frac{Bw^2}{w_0^2} \sin wt + C \sin w_0 t\right)$$

Therefore, if the length D is taken as given by Equation 17, Equation 24 becomes:

(25) $$a_t = 0$$

which shows that there will be no lateral forces on the moving system of the gravity meter of instrument N.

It is, therefore, very desirable to use the value of D given in Equation 17 not only to make the corrections for horizontal accelerations simple but also to reduce the possibility of the moving system of the gravity meter hitting the support. The method used to determine the optimum point D in practice has been briefly described previously and it involves fixing a level bubble to the gravity meter at the same height as the gravity-responsive element in the meter. The gravity meter is then set into oscillation about the gimbal joint from which it is hanging, and the motion of the level bubble is observed. If the bubble moves, weight is added above or below the center of gravity of the instrument or the distance from the instrument to the gimbal is changed. Adjustments are made until the level bubble does not move even though the gravity meter oscillates about the gimbal joint.

In the preferred form of the invention shown in Figure 2, the center of gravity 65 of the gravity meter moving system 64 is spaced at the appropriate distance below the point of support 16 in order to satisfy the requirement of Equation 17.

It has been mentioned that a gravity meter suspended as shown in Figure 2 will give an average reading $\overline{a_n}$ which is not in general equal to the value of gravity $g$. The relation between $\overline{a_n}$ and $g$ is given by Equation 20. It shows that a correction equal to $$\frac{g\theta^2}{2}$$

must be subtracted from $\overline{a_n}$ to obtain $g$. In order to apply this correction to the preferred form of this invention, $\theta^2$ will have to be expressed in terms of the tilt angles $\theta^2{}_{37}$ and $\theta^2{}_{38}$ corresponding to tilts of the plate 30 about axes 37—37' and 38—38', respectively. Since these axes are at right angles to each other:

(26) $\qquad \overline{\theta^2} = \overline{\theta_{37}^2} + \overline{\theta_{38}^2}$ Therefore, Equation 20 becomes (27) $\qquad g = \overline{a_n} - \dfrac{g\overline{\theta_{37}^2}}{2} - \dfrac{g\overline{\theta_{38}^2}}{2}$ In the preferred form of the invention $\theta_{37}$ and $\theta_{38}$ are proportional to the voltages obtained from the two potentiometers 46 associated with the screws 33 and 33', respectively. Using these voltages as inputs, it is possible to construct analogue computers to compute the quantities $$\frac{g\overline{\theta_{37}^2}}{2} \text{ and } \frac{g\overline{\theta_{38}^2}}{2}$$

appearing in Equation 7. One such computer is described in the copending patent application, Serial No. 459,489. In actual practice, an analogue computer is used which has as outputs, shaft rotations proportional to $$\frac{g\overline{\theta_{37}^2}}{2} \text{ and } \frac{g\overline{\theta_{38}^2}}{2}$$

These shaft rotations are subtracted from a shaft rotation proportional to $a_n$ recorded. Later the value of $g$ is obtained from the record. Although this invention has been described above as primarily for gravity meters, it is believed evident that this invention can be utilized for damping out the oscillations of other bodies or instruments.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for damping out oscillations of a body hanging from a point of suspension which permits free swinging of the body in any direction, comprising tilt responsive means having an operative connection with said body and movable in accordance with the oscillations of said body, means for shifting the point of suspension of said body, and means for actuating said shifting means in accordance with the movement of said tilt responsive means, said shifting being out of phase with the oscillations of said body and in a direction to damp out said oscillations without introducing friction at the point of suspension.

2. An apparatus for damping out oscillations of a body hanging from a point of suspension which permits free swinging of the body in any direction, comprising tilt responsive means having an operative connection with said body and including means for generating output values in accordance with the tilt imparted to said tilt responsive means, electrical means for shifting the output values of said tilt responsive means out of phase with said oscillations, and means for transmitting such out of phase output values to said point of suspension of said body to shift said point of suspension in a direciton and at a time which is out of phase with the oscillations of said body to thereby damp out said oscillations without introducing friction at the point of suspension.

3. An oscillation damping mechanism for a gravity meter, comprising a support, suspending means for hanging said gravity meter from said support, said suspending means permitting free swinging of the gravity meter about substantially horizontal axes to allow the gravity meter to assume a level position under the influence of gravity when horizontal accelerations of the support are absent, said suspending means having low friction to allow accurate leveling of the gravity meter, tilt responsive means having an operative connection with said gravity meter and responsive to the oscillations of said meter about its suspending means, said tilt responsive means including means for generating output values in accordance with the tilt of said means and means for transmitting the output values of said tilt responsive means to said suspending means to move same in a direction and at a time which is out of phase with the oscillations of said meter to thereby damp out said oscillations without introducing friction in the suspending means to effect such damping.

4. An oscillation damping mechanism for a gravity meter, comprising a support, suspending means for hanging said gravity meter from said support, said suspending means permitting free swinging of the gravity meter about substantially horizontal axes to allow the gravity meter to assume a level position under the influence of gravity when horizontal accelerations of the support are absent, said suspending means having low friction to allow accurate leveling of the gravity meter, tilt responsive means having an operative connection with said gravity meter and movable in accordance with the oscillations of said meter about its suspending means, said tilt responsive means including a means for generating output values in accordance with the tilt of said means, electrical means for differentiating the output values of said tilt responsive means, and means for transmitting such differentiated responses to said suspending means to shift same to thereby damp out said oscillations.

5. The structure set forth in claim 3, wherein said means for transmitting the output values of said tilt responsive means includes an electrical servo motor system.

6. The structure set forth in claim 4, wherein said means for transmitting the differentiated responses includes an electrical servo motor system.

7. An oscillation damping mechanism for a gravity meter, comprising a support, suspending means for hanging said gravity meter from said support, said suspending means permitting free swinging of the gravity meter about substantially horizontal axes to allow the gravity meter to assume a level position under the influence of gravity when horizontal accelerations of the support are absent, said suspending means having low friction to allow accurate leveling of the gravity meter, tilting means having an operative connection with said gravity meter and movable in accordance with the oscillations of said meter about its suspending means, said tilting means including a first plate connected to said meter, a second plate mounted on said first plate for tilting movement relative thereto, means for maintaining the second plate horizontal in space as said first plate tilts in accordance with the oscillations of said gravity meter, means for measuring the tilting of said first plate relative to said second plate, and means for transmitting the measurements of said measuring means to said suspending means to move said suspending means in a direction and at a time which is out of phase with the oscillations of said meter to thereby damp out said oscillations.

8. The structure set forth in claim 7, wherein said means for transmitting the measurements of said measuring means includes means for generating output values in accordance with the measurements of said measuring means and an electrical servo motor system with means for electrically shifting the output values generated by said measuring means out of phase with the relative tilting movements of said plates so that the servo motor system transmits such tilting movements to the point of suspension of said support out of phase with the oscillations of said gravity meter for damping out such oscillations.

9. An instrument for measuring gravity when large accelerations are present, including, a support, a gravity meter, suspending means for hanging said gravity meter from said support, said suspending means permitting free swinging of the gravity meter about substantially horizontal axes to allow the gravity meter to assume a level position under the influence of gravity when accelerations are absent, said suspending means having low friction to allow accurate leveling of the gravity meter, a stabilized platform mounted on said gravity meter, means for measuring the tilt in two directions of said stabilized platform relative to said gravity meter, said tilts being a measure of the horizontal accelerations to which the gravity meter is subjected, said tilt measuring means providing voltages proportional to the tilts, electrical means for shifting the phase of said tilt voltages, and servo means operated by said shifted voltages, said servo means displacing said suspending means, said displacements having horizontal components corresponding to the directions in which said tilts between the stabilized platform and gravity meter were measured, whereby the oscillations of the gravity meter are damped out.

10. An instrument for measuring gravity when large accelerations are present including, a support, a gravity meter having a weight held up by spring means, suspending means for hanging said gravity meter from said support, said suspending means permitting free swinging of the gravity meter about substantially horizontal axes to allow the gravity meter to assume a level position under the influence of gravity when accelerations are absent, the distance in centimeters between said horizontal axes and said gravity meter weight being substantially equal to D in the equation $$D = \frac{g}{w_0^2}$$

when $w_0 = 2\pi$ times the natural frequency in cycles/second of the gravity meter swinging about said horizontal axes and $g =$ the acceleration of gravity in centimeters/second$^2$, a stabilized platform mounted on said gravity meter, means for measuring the tilt in two directions of said stabilized platform relative to said gravity meter, said tilts being a measure of the horizontal accelerations to which the gravity meter is subjected, means for converting the measurements made by said measuring means into output values and means for transmitting the output values of the measuring means to said suspending means to move same in substantially horizontal directions for damping out the oscillations of said meter.

11. An instrument for measuring gravity when large accelerations are present, a support, a gravity meter having a weight held up by a spring, suspending means for hanging said gravity meter from said support, said suspending means permitting free swinging of the gravity meter about substantially horizontal axes to allow the gravity meter to assume a level position under the influence of gravity when accelerations are absent, said suspending means having low friction to allow accurate leveling of the gravity meter, the distance in centimeters between said horizontal axes and said gravity meter weight being substantially equal to D in the equation $$D = \frac{g}{w_0^2}$$

when $w_0 = 2\pi$ times the natural frequency in cycles/second of the gravity meter swinging about said horizontal axes and $g =$ the acceleration of gravity in centimeters/second$^2$, a stabilized platform mounted on said gravity meter, means for measuring the tilt in two directions of said stabilized platform relative to said gravity meter, said tilts being a measure of the horizontal accelerations to which the gravity meter is subjected, said tilt measuring means providing voltages proportional to the tilts, electrical means for shifting the phase of said tilt voltages, and servo means operated by said phase shifted voltages, said servo means displacing said support, said displacement having horizontal components corresponding to the directions in which said tilts between the stabilized platform and gravity meter were measured, whereby the oscillations of the gravity meter are damped out.

12. An apparatus for damping out oscillations of a body hanging from a point of suspension which permits free swinging of the body in any direction, comprising means responsive to the oscillations of said body, and means for transmitting the responses of said last-mentioned means to said point of suspension of said body to shift said point of suspension in a direction and at a time which are out of phase with the oscillations of said body to thereby damp out said oscillations without introducing friction at the point of suspension.

13. An apparatus for damping out oscillations of a body hanging from a point of suspension which permits free swinging of the body in any direction, comprising an oscillation-responsive means operatively associated with said body for responding to the oscillations of said body, and means for transmitting the responses of said oscillation-responsive means to said point of suspension to shift said point of suspension in a direction and at a time which are out of phase with the oscillations of said body to thereby damp out said oscillations without introducing friction at the point of suspension.

14. An instrument for measuring gravity when large accelerations are present including, a support, a gravity meter, suspending means for hanging said gravity meter from said support, said suspending means permitting free swinging of the gravity meter about substantially horizontal axes to allow the gravity meter to assume a level position under the influence of gravity when accelerations are absent, said suspending means having low friction to allow accurate leveling of the gravity meter, tilt measuring means for measuring the tilt of said gravity meter, said tilt measuring means generating output values in accordance with the measurements which are made, means for differentiating the output values of said tilt responsive means, and servo means operated by said differentiated output values, said servo means displacing said support, said displacements having horizontal components corresponding to the directions in which said tilts were measured, said servo means thus acting to damp out free swinging of said gravity meter.

15. An instrument for measuring gravity when large accelerations are present including, a support, a gravity meter having a weight held up by a spring, suspending means for hanging said gravity meter from said support, said suspending means permitting free swinging of the gravity meter about substantially horizontal axes to allow the gravity meter to assume a level position under the influence of gravity when accelerations are absent, the distance in cm. between said horizontal axes and said gravity meter weight being substantially equal to D in the equation $$D = \frac{g}{w_0^2}$$

when $w_0 = 2\pi$ times the natural frequency in cycles/second of the gravity meter swinging about said horizontal axes and $g$=the acceleration of gravity in centimeters/second$^2$, a stabilized reference device mounted on said gravity meter, said stabilized reference device measuring the tilt in two directions of said gravity meter, said tilts being a measure of the horizontal accelerations to which the gravity meter is subjected.

16. An instrument for measuring gravity when large accelerations are present including, a support, a gravity meter having a weight held up by a spring, suspending means for hanging said gravity meter from said support, said suspending means permitting free swinging of the gravity meter about substantially horizontal axes to allow the gravity meter to assume a level position under the influence of gravity when accelerations are absent, said gravity meter weight being spaced from said horizontal axes at the distance at which tangential accelerations due to said free swinging are substantially absent, a stabilized reference device mounted on said gravity meter, said stabilized reference device measuring the tilt in two directions of said gravity meter, said tilts being a measure of the horizontal accelerations to which the gravity meter is subjected.

References Cited in the file of this patent
UNITED STATES PATENTS

| | | |
|---|---|---|
| 2,136,219 | Scherbatskoy | Nov. 8, 1938 |
| 2,589,709 | La Coste | Mar. 18, 1952 |
| 2,589,710 | La Coste | Mar. 18, 1952 |
| 2,634,610 | Silverman | Apr. 14, 1952 |
| 2,660,062 | Frowe | Nov. 24, 1953 |
| 2,674,885 | Silverman | Apr. 13, 1954 |